(No Model.)

M. L. HAWKS.
KNIFE.

No. 495,699. Patented Apr. 18, 1893.

Witnesses:

Inventor:
Moses L. Hawks.

UNITED STATES PATENT OFFICE.

MOSES L. HAWKS, OF CHICAGO, ILLINOIS.

KNIFE.

SPECIFICATION forming part of Letters Patent No. 495,699, dated April 18, 1893.

Application filed November 21, 1891. Serial No. 412,623. (No model.)

*To all whom it may concern:*

Be it known that I, MOSES L. HAWKS, a citizen of the United States, residing at Chicago, in the county of Cook and State of Illinois, have invented a new and useful Knife, of which the following is a specification.

My invention relates to that class of knives that are provided with handles, and designed for general household use, and the objects of my improvement are to afford proper facilities for adjusting and connecting the knife blade with the handle, and to combine therewith a cutting edge that is adapted to the work required of the knife. I attain these objects by the mechanism illustrated in the accompanying drawings in which—

Figure 1:
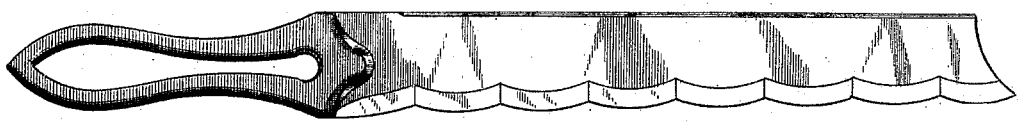
Figure 2:
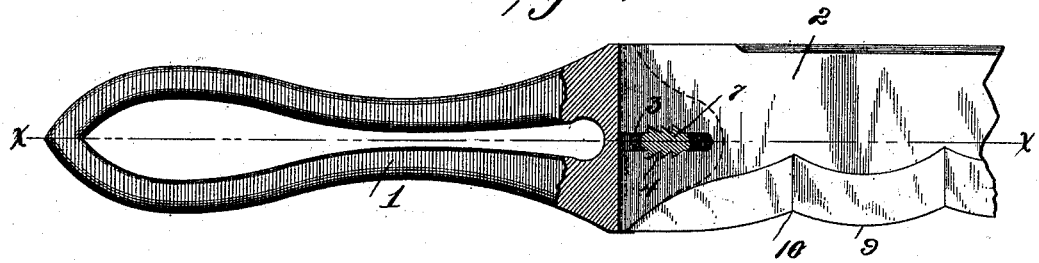
Figure 3:
Figure 4:
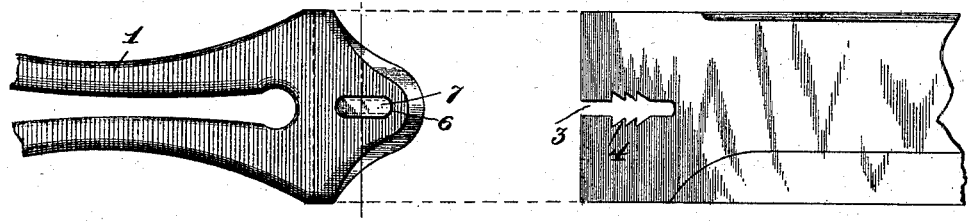
Figures 5, 6:
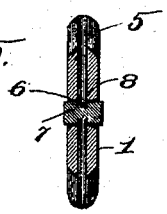

Figure 1, is a side elevation of my improved knife as it appears when finished, the knife being nickel-plated. Fig. 2. is a similar view showing the inner end of the blade with a part of the handle cut away exposing the blade, and showing the rivet as it appears after being compressed with the parts united. Fig. 3. is a longitudinal section of the same on the line $x\ x$, Fig. 2. Fig. 4. shows the inner ends of the blade and handle detached, with rivet inserted within the slot in the handle. Fig. 5. is a vertical section of the handle on the line $y, y$, Fig. 4, showing rivet inserted in position to receive the blade. Fig. 6. is a side view of the rivet.

Like numerals indicate like parts in all the figures of the drawings.

That which is to be the inner end of the blade is cut square across at right angles with the back, or nearly so, and at its transverse center at that point is formed an open longitudinal slot 3, Fig. 4, having notches and regular receding teeth therein, shown at 4 Fig. 4. The handle which is cast preferably, and of suitable metal, is formed with a lateral groove 5, Figs. 3 and 5, which is adapted to receive the knife blade. A transverse slot 6, extends through the handle near its inner end and into this slot is closely fitted a flat rivet 7, Fig. 4, having narrow grooves in its sides as shown at 8, Figs. 5 and 6, the rivet being inserted within the slot 6, so that the grooves in the rivet and the lateral groove 5, in the handle will correspond evenly with each other as shown in Fig. 5. The knife blade is then inserted within the lateral groove 5, so that the receding teeth 4, will rest with their points bearing within the grooves 8, in either side of the rivet, and with the inner end of the blade resting against the bottom of the lateral groove 5, in the handle. The rivet is then compressed or hammered down when it being of softer metal than the steel knife blade the rivet is made to expand and press into the notches and clinch around the points and over the edges of the receding teeth as shown at 7, Fig. 2, and at the same time clamping what may be termed, the ears of the handle tightly upon each side of the knife blade, thereby very firmly uniting the parts.

The lateral groove 5, in the handle is cut in preferably, with a saw used for such purposes and it will be seen that should the said groove 5, vary in depth as is frequently the case with imperfect machinery or careless workmen it will not materially interfere with properly adjusting the blade in the handle so that the inner end of the blade will always bear firmly upon the extreme bottom of the lateral groove 5, as desired, the toothed slot 3, in the blade being of sufficient length to admit of such adjustment. It is therefore apparent that by means of this device and construction I am at all times able to obtain a perfect fit of the knife blade into the handle, a useful result which could not be accomplished with round holes and round rivets such as have been employed and used heretofore. The teeth 4, being receding and presenting their sharp points toward the point of the knife blade, as the rivet 7, is compressed within the slots 3. and 6, the tendency is to force the blade still farther into the handle as greater pressure is brought to bear upon the points of the receding teeth than elsewhere. The rivet 7, being flat presents a greater bearing surface within the slot 3, in the knife blade and serves to prevent any lateral movement or turning of the blade upon the rivet, and the points of the teeth being embedded within the grooves 8 in the rivet after compressing effectually prevents the blade from being drawn out of the handle, and altogether making a very neat, strong and serviceable connection of a knife blade with the handle.

What I claim as my invention, and desire to secure by Letters Patent, is—

1. A knife blade, the inner end of which is formed with an open longitudinal slot having notches and receding teeth therein substantially as shown and described and for the purpose specified.

2. A knife handle, the inner end of which is formed with a lateral groove and transverse slot, into which is fitted a flat rivet having a narrow groove in its sides and arranged to engage with the knife blade substantially as shown and described and for the purpose specified.

MOSES L. HAWKS.

Witnesses:
M. BYRON RICH,
GEORGE N. STONE.